(12) United States Patent
Hodge et al.

(10) Patent No.: US 10,397,410 B2
(45) Date of Patent: *Aug. 27, 2019

(54) MESSAGE EXCHANGE

(71) Applicant: Value-Added Communications, Inc., Reston, VA (US)

(72) Inventors: Stephen Hodge, Aubrey, TX (US); David Woody, Allen, TX (US)

(73) Assignee: Value-Added Communications, Inc., Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/878,130

(22) Filed: Jan. 23, 2018

(65) Prior Publication Data
US 2018/0213090 A1 Jul. 26, 2018

Related U.S. Application Data

(63) Continuation of application No. 14/626,804, filed on Feb. 19, 2015, now Pat. No. 9,876,915, which is a
(Continued)

(51) Int. Cl.
*H04M 1/64* (2006.01)
*H04M 15/00* (2006.01)
(Continued)

(52) U.S. Cl.
CPC ............ *H04M 15/83* (2013.01); *H04M 3/38* (2013.01); *H04M 3/533* (2013.01);
(Continued)

(58) Field of Classification Search
CPC .................................................. H04M 15/83
See application file for complete search history.

(56) References Cited

U.S. PATENT DOCUMENTS 4,054,756 A 10/1977 Comella et al.
4,191,860 A 3/1980 Weber
(Continued)

FOREIGN PATENT DOCUMENTS

EP 0989720 A1 3/2000
GB 2400284 A 10/2004
(Continued)

OTHER PUBLICATIONS

"Cisco IAD2400 Series Business-Class Integrated Access Device", Cisco Systems Datasheet, 2003.
(Continued)

*Primary Examiner* — Joseph T Phan
(74) *Attorney, Agent, or Firm* — Sterne, Kessler, Goldstein & Fox P.L.L.C.

(57) ABSTRACT

Disclosed is a voice message exchange system and method for improving communication between an inmate and a third party by enabling the inmate to leave a message when a call is not answered and further allowing the third party who receives the message to reply with a message to the inmate. Additionally, outside parties that meet the institution's requirements can leave messages for inmates at any time. The present invention can be used as an add-on to legacy inmate call management systems or incorporated internally into an inmate call management system. The system also provides monitoring, controlling, recording, and billing means.

20 Claims, 3 Drawing Sheets

Related U.S. Application Data continuation-in-part of application No. 13/967,076, filed on Aug. 14, 2013, now Pat. No. 9,282,188, which is a continuation-in-part of application No. 13/584,295, filed on Aug. 13, 2012, now Pat. No. 8,515,031, which is a continuation of application No. 11/045,590, filed on Jan. 28, 2005, now Pat. No. 8,243,891.

(51) Int. Cl.
  *H04M 3/38* (2006.01)
  *H04M 3/533* (2006.01)
  *H04M 17/00* (2006.01)
  *H04M 17/02* (2006.01)

(52) U.S. Cl.
  CPC ......... *H04M 15/854* (2013.01); *H04M 15/88* (2013.01); *H04M 17/00* (2013.01); *H04M 17/02* (2013.01); *H04M 17/10* (2013.01); *H04M 2203/2016* (2013.01); *H04M 2215/0116* (2013.01)

(56) References Cited

U.S. PATENT DOCUMENTS

| | | |
|---|---|---|
| 4,652,700 A | 3/1987 | Matthews et al. |
| 4,766,604 A | 8/1988 | Axberg |
| 4,935,956 A | 6/1990 | Hellwarth et al. |
| 5,068,888 A | 11/1991 | Scherk et al. |
| 5,319,702 A | 6/1994 | Kitchin et al. |
| 5,351,287 A | 9/1994 | Bhattacharyya et al. |
| 5,535,261 A | 7/1996 | Brown et al. |
| 5,539,812 A | 7/1996 | Kitchin et al. |
| 5,553,145 A | 9/1996 | Micali |
| 5,648,916 A | 7/1997 | Manduley |
| 5,655,013 A | 8/1997 | Gainsboro |
| 5,705,995 A | 1/1998 | Lafflin et al. |
| 5,740,231 A | 4/1998 | Cohn et al. |
| 5,745,558 A | 4/1998 | Richardson, Jr. et al. |
| 5,768,355 A | 6/1998 | Salibrici et al. |
| 5,778,313 A | 7/1998 | Fougnies |
| 5,805,810 A | 9/1998 | Maxwell |
| 5,826,034 A | 10/1998 | Albal |
| 5,838,790 A | 11/1998 | McAuliffe et al. |
| 5,848,397 A | 12/1998 | Marsh et al. |
| 5,854,975 A | 12/1998 | Fougnies et al. |
| 5,872,926 A | 2/1999 | Levac et al. |
| 5,894,558 A | 4/1999 | Falker |
| 5,937,037 A | 8/1999 | Kamel et al. |
| 5,956,717 A | 9/1999 | Kraay et al. |
| 5,958,005 A | 9/1999 | Thorne et al. |
| 5,982,506 A | 11/1999 | Kara |
| 5,987,611 A | 11/1999 | Freund |
| 6,002,689 A | 12/1999 | Christie |
| 6,052,454 A | 4/2000 | Kek et al. |
| 6,061,718 A | 5/2000 | Nelson |
| 6,064,963 A | 5/2000 | Gainsboro |
| 6,067,514 A | 5/2000 | Chen |
| 6,097,791 A | 8/2000 | Ladd et al. |
| 6,137,864 A | 10/2000 | Yaker |
| 6,145,004 A | 11/2000 | Walsh |
| 6,151,679 A | 11/2000 | Friedman et al. |
| 6,161,139 A | 12/2000 | Win et al. |
| 6,173,259 B1 | 1/2001 | Bijl et al. |
| 6,173,284 B1 | 1/2001 | Brown |
| 6,192,114 B1 | 2/2001 | Council |
| 6,226,362 B1 | 5/2001 | Gerszberg et al. |
| 6,226,363 B1 | 5/2001 | Miller |
| 6,233,313 B1 | 5/2001 | Farris et al. |
| 6,233,318 B1 | 5/2001 | Picard et al. |
| 6,246,871 B1 | 6/2001 | Ala-Laurila |
| 6,249,808 B1 | 6/2001 | Seshadri |
| 6,285,777 B2 | 9/2001 | Kanevsky et al. |
| 6,304,636 B1 | 10/2001 | Goldberg et al. |
| 6,356,867 B1 | 3/2002 | Gabai et al. |
| 6,363,414 B1 | 3/2002 | Nicholls et al. |
| 6,366,651 B1 | 4/2002 | Griffith et al. |
| 6,389,276 B1 | 5/2002 | Brilla et al. |
| 6,400,272 B1 | 6/2002 | Holtzman et al. |
| 6,411,685 B1 | 6/2002 | O'Neal |
| 6,477,492 B1 | 11/2002 | Connor |
| 6,526,335 B1 | 2/2003 | Treyz et al. |
| 6,560,323 B2 | 5/2003 | Gainsboro |
| 6,570,970 B2 | 5/2003 | Gruchala et al. |
| 6,591,367 B1 | 7/2003 | Kobata et al. |
| 6,603,838 B1 | 8/2003 | Brown et al. |
| 6,606,648 B1 | 8/2003 | Mukundan et al. |
| 6,611,583 B1 | 8/2003 | Gainsboro |
| 6,639,977 B1 | 10/2003 | Swope et al. |
| 6,665,378 B1 | 12/2003 | Spielman et al. |
| 6,665,380 B1 | 12/2003 | Cree et al. |
| 6,668,045 B1 | 12/2003 | Mow |
| 6,681,114 B2 | 1/2004 | Chang et al. |
| 6,684,248 B1 | 1/2004 | Janacek et al. |
| 6,714,982 B1 | 3/2004 | McDonough et al. |
| 6,775,359 B1 | 8/2004 | Ron et al. |
| 6,788,771 B2 | 9/2004 | Manto |
| 6,801,932 B1 | 10/2004 | Picoult et al. |
| 6,819,932 B2 | 11/2004 | Allison et al. |
| 6,850,147 B2 | 2/2005 | Prokoski et al. |
| 6,857,024 B1 | 2/2005 | Chen et al. |
| 6,865,260 B1 | 3/2005 | Meadows et al. |
| 6,879,677 B2 | 4/2005 | Trandal et al. |
| 6,950,502 B1 | 9/2005 | Jenkins |
| 7,003,308 B1 | 2/2006 | Fuoss et al. |
| 7,013,002 B2 | 3/2006 | Link et al. |
| 7,039,071 B2 | 5/2006 | Pekonen |
| 7,039,171 B2 | 5/2006 | Gickler |
| 7,039,949 B2 | 5/2006 | Cartmell et al. |
| 7,046,779 B2 | 5/2006 | Hesse |
| 7,058,163 B1 | 6/2006 | Parekh et al. |
| 7,079,636 B1 | 7/2006 | McNitt et al. |
| 7,085,359 B2 | 8/2006 | Crites et al. |
| 7,095,829 B2 | 8/2006 | Claudatos et al. |
| 7,106,843 B1 | 9/2006 | Gainsboro et al. |
| 7,136,462 B2 | 11/2006 | Pelaez et al. |
| 7,158,621 B2 | 1/2007 | Bayne |
| 7,197,560 B2 | 3/2007 | Caslin et al. |
| 7,248,680 B1 | 7/2007 | Gainsboro |
| 7,256,816 B2 | 8/2007 | Profanchik et al. |
| 7,260,383 B1 | 8/2007 | Ngan |
| 7,265,853 B1 | 9/2007 | Kara et al. |
| 7,277,695 B2 | 10/2007 | Petty et al. |
| 7,278,028 B1 | 10/2007 | Hingoranee |
| 7,333,798 B2 | 2/2008 | Hodge |
| 7,359,494 B2 | 4/2008 | Leonard |
| 7,363,302 B2 | 4/2008 | Lester |
| 7,496,345 B1 | 2/2009 | Rae et al. |
| 7,505,406 B1 | 3/2009 | Spadaro et al. |
| 7,519,076 B2 | 4/2009 | Janssen et al. |
| 7,551,732 B2 | 6/2009 | Anders |
| 7,561,679 B1 | 7/2009 | Kalbag |
| 7,561,680 B1 | 7/2009 | Falcone et al. |
| 7,565,687 B2 | 7/2009 | Noguchi et al. |
| 7,583,974 B2 | 9/2009 | Benco et al. |
| 7,681,032 B2 | 1/2010 | Breton et al. |
| 7,673,058 B1 | 3/2010 | White et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 | 9/2010 | Keiser et al. |
| 7,881,446 B1 | 2/2011 | Apple et al. |
| 7,899,167 B1 | 3/2011 | Rae |
| 8,000,269 B1 | 8/2011 | Rae et al. |
| 8,014,800 B2 | 9/2011 | Törnkvist |
| 8,130,919 B2 | 3/2012 | Kalbag |
| 8,204,177 B2 | 6/2012 | Harper |
| 8,218,736 B1* | 7/2012 | McClintock .......... H04M 1/642 379/88.12 |
| 8,232,862 B2 | 7/2012 | Lowe |
| 8,238,534 B2 | 8/2012 | Link et al. |
| 8,243,891 B2 | 8/2012 | Hodge et al. |
| 8,255,300 B2 | 8/2012 | Polozola et al. |

(56) References Cited

U.S. PATENT DOCUMENTS

| | | |
|---|---|---|
| 8,458,732 B2 | 6/2013 | Hanna et al. |
| 8,488,756 B2 | 7/2013 | Hodge et al. |
| 8,509,390 B2 | 8/2013 | Harper |
| 8,515,031 B2 | 8/2013 | Hodge et al. |
| 8,577,003 B2 | 11/2013 | Rae |
| 8,626,118 B2 | 1/2014 | Smith et al. |
| 8,725,115 B2 | 5/2014 | Liu et al. |
| 8,838,622 B2 | 9/2014 | Irving et al. |
| 9,043,813 B2 | 5/2015 | Hanna et al. |
| 9,077,680 B2 | 7/2015 | Harper |
| 9,282,188 B2 | 3/2016 | Hodge et al. |
| 9,306,883 B2 | 4/2016 | Hodge et al. |
| 9,621,714 B2 | 4/2017 | Seyfetdinov |
| 9,667,663 B2 | 5/2017 | Hodge et al. |
| 9,680,878 B2 | 6/2017 | Hodge et al. |
| 9,680,879 B2 | 6/2017 | Hodge et al. |
| 9,757,032 B2 | 9/2017 | Gross et al. |
| 9,787,724 B2 | 10/2017 | Hodge et al. |
| 9,807,123 B2 | 10/2017 | Hodge et al. |
| 9,871,915 B2 | 1/2018 | Hodge et al. |
| 9,876,915 B2 | 1/2018 | Hodge et al. |
| 9,923,932 B2 | 3/2018 | Hodge et al. |
| 9,967,291 B1 | 5/2018 | Hodge et al. |
| 2002/0007453 A1 | 1/2002 | Nemovicher |
| 2002/0071537 A1 | 6/2002 | Gainsboro |
| 2002/0111887 A1 | 8/2002 | McFarlane et al. |
| 2002/0159600 A1 | 10/2002 | Weiner |
| 2002/0183040 A1 | 12/2002 | Lundstrom et al. |
| 2003/0002639 A1 | 1/2003 | Huie |
| 2003/0009333 A1 | 1/2003 | Sharma et al. |
| 2003/0070076 A1 | 4/2003 | Michael |
| 2003/0086546 A1 | 5/2003 | Falcone et al. |
| 2003/0126470 A1 | 7/2003 | Crites et al. |
| 2003/0187939 A1 | 10/2003 | O'Brien |
| 2003/0198325 A1 | 10/2003 | Bayne |
| 2003/0200078 A1 | 10/2003 | Luo et al. |
| 2003/0216983 A1 | 11/2003 | Bodin |
| 2004/0029564 A1 | 2/2004 | Hodge |
| 2004/0058667 A1 | 3/2004 | Pienmaki et al. |
| 2004/0076272 A1 | 4/2004 | Zafar et al. |
| 2004/0081296 A1 | 4/2004 | Brown et al. |
| 2004/0120475 A1 | 6/2004 | Bauer et al. |
| 2004/0236838 A1 | 11/2004 | Tout |
| 2004/0252447 A1 | 12/2004 | Hesse et al. |
| 2005/0010573 A1 | 1/2005 | Garg |
| 2005/0055411 A1 | 3/2005 | Bouchard |
| 2005/0078612 A1 | 4/2005 | Lang |
| 2005/0080868 A1 | 4/2005 | Malik |
| 2005/0094794 A1 | 5/2005 | Creamer et al. |
| 2005/0114192 A1 | 5/2005 | Tor et al. |
| 2005/0125226 A1 | 6/2005 | Magee |
| 2005/0207341 A1 | 9/2005 | Zhang |
| 2005/0265322 A1 | 12/2005 | Hester |
| 2005/0286498 A1 | 12/2005 | Rand et al. |
| 2005/0287993 A1 | 12/2005 | Gogic |
| 2006/0062355 A1 | 3/2006 | Leonard |
| 2006/0098796 A1 | 5/2006 | Link |
| 2006/0149644 A1 | 7/2006 | Salmar et al. |
| 2006/0168015 A1 | 7/2006 | Fowler |
| 2006/0245552 A1 | 11/2006 | Hayashi |
| 2006/0245559 A1 | 11/2006 | Hodge et al. |
| 2007/0041545 A1 | 2/2007 | Gainsboro |
| 2007/0044734 A1 | 3/2007 | Maloney et al. |
| 2007/0155411 A1 | 7/2007 | Morrison |
| 2007/0165790 A1 | 7/2007 | Taori et al. |
| 2007/0207785 A1 | 9/2007 | Chatterjee et al. |
| 2007/0233610 A1 | 10/2007 | Gyllenskog et al. |
| 2007/0239898 A1 | 10/2007 | Friend et al. |
| 2007/0263853 A1 | 11/2007 | Pearson et al. |
| 2008/0037722 A1 | 2/2008 | Klassen |
| 2008/0126951 A1 | 5/2008 | Sood et al. |
| 2008/0200152 A1 | 8/2008 | Moore |
| 2008/0219414 A1 | 9/2008 | Ramamoorthy et al. |
| 2009/0054031 A1 | 2/2009 | Smith et al. |
| 2009/0086631 A1 | 4/2009 | Jayapalan et al. |
| 2009/0086936 A1 | 4/2009 | Clifford et al. |
| 2009/0197622 A1* | 8/2009 | Atarius ............ H04L 51/30 455/466 |
| 2009/0274279 A1 | 11/2009 | Reynolds |
| 2010/0023472 A1 | 1/2010 | Loeb |
| 2010/0054433 A1 | 3/2010 | Gustave et al. |
| 2010/0138357 A1 | 6/2010 | Mufti-Bey |
| 2010/0189228 A1 | 7/2010 | Seyfetdinov |
| 2010/0254263 A1 | 10/2010 | Chen et al. |
| 2010/0299761 A1 | 11/2010 | Shapiro |
| 2010/0318441 A1 | 12/2010 | Harper |
| 2011/0106894 A1 | 5/2011 | Hodge et al. |
| 2011/0286591 A1 | 11/2011 | Fulton et al. |
| 2012/0202454 A1 | 8/2012 | Smith et al. |
| 2013/0162423 A1 | 6/2013 | Rowe et al. |
| 2013/0179949 A1 | 7/2013 | Shapiro |
| 2013/0246535 A1 | 9/2013 | Yadava et al. |
| 2014/0020063 A1 | 1/2014 | Hodge et al. |
| 2014/0044242 A1 | 2/2014 | Hodge et al. |
| 2014/0280631 A1 | 9/2014 | Torgersrud |
| 2015/0043721 A1 | 2/2015 | Hodge et al. |
| 2015/0046978 A1 | 2/2015 | Hodge et al. |
| 2015/0047004 A1 | 2/2015 | Hodge et al. |
| 2015/0066523 A1 | 3/2015 | Pan |
| 2015/0201080 A1 | 7/2015 | Hodge et al. |
| 2015/0201081 A1 | 7/2015 | Hodge et al. |
| 2015/0223705 A1 | 8/2015 | Sadhu |
| 2016/0142537 A1 | 5/2016 | Hodge et al. |
| 2016/0156625 A1 | 6/2016 | Hodge et al. |
| 2016/0381082 A1 | 12/2016 | Hodge et al. |
| 2017/0127257 A1 | 5/2017 | Saxena et al. |
| 2017/0142258 A1 | 5/2017 | Seyfetdinov |
| 2017/0279857 A1 | 9/2017 | Hodge et al. |
| 2017/0324834 A1 | 11/2017 | Hodge |

FOREIGN PATENT DOCUMENTS

| | | |
|---|---|---|
| WO | WO 99/21330 A1 | 4/1999 |
| WO | WO 99/48054 A1 | 9/1999 |

OTHER PUBLICATIONS

"SIP and IPLinkTM in the Next Generation Network: An Overview," Intel, 2001.

"Voice Over Packet in Next Generation Networks: An Architectural Framework," Bellcore, Special Report SR-4717, Issue 1, Jan. 1999.

Advanced Technologies Group, Inc, White Paper: Introduction to Advanced Technologies Group, Inc., Inmate Correspondence System, Aug. 5, 2002, American Corrections Association Annual Conference, Anaheim, California.

Advanced Technologies Group, Inc., Correspondence System Poster, published Jul. 29, 2002 by Exhibit-Resources Midwest, displayed at Aug. 2002 American Corrections Association Annual Conference, Anaheim, California.

Advanced Technologies Group, Inc., Offender Management Suite: Correspondence System Brochure, printing invoice dated Aug. 2, 2002, brochure distributed at Aug. 2002 American Corrections Association Annual Conference, Anaheim, California.

Avtalion, J., "Keeping tabs on call centres," Telecommunications, vol. 31, No. 7, Jul. 1997, pp. 70-72.

BubbleLINK® Software Architecture (Science Dynamics 2003).

Bur Goode, Voice Over Internet Protocol (VoIP), Proceedings of the IEEE, vol. 90, No. 9, 1495-1517 (Sep. 2002).

Clifford J. Weinstein, MIT, The Experimental Integrated Switched Network—A System-Level Network Test Facility (IEEE 1983).

Commander Call Control System, Rev. 1.04 (Science Dynamics 2002).

Creps, et al., "Is somebody watching? Employee communications and privacy," Risk Management vol. 44, No. 4, Apr. 1997, pp. 22-28.

Definition of "telephony", McGraw-Hill Dictionary of Scientific and Technical Terms, 6th Edition (McGraw-Hill, 2003).

Definition of "Local Area Network (LAN)" and "Wide Area Network (WAN)," Microsoft Computer Dictionary (Microsoft Press 2002), pp. 304 and 561.

(56) References Cited

OTHER PUBLICATIONS

Digital Copy of "Bellcore Notes on the Networks," Bellcore, Special Report SR-2275, Issue 3, Dec. 1997.
English-language Abstract for European Patent Publication No. 0989720 A1; 2 pages.
Excerpts from U.S. Appl. No. 60/538,933 to Shapiro, filed Jan. 22, 2004, 7 pages.
Excerpts from the Prosecution History of U.S. Appl. No. 10/135,878, filed Apr. 29, 2002.
File History of U.S. Pat. No. 7,899,167, U.S. Appl. No. 10/642,532, filed Aug. 15, 2003.
File history of U.S. Pat. No. 8,515,031, U.S. Appl. No. 13/584,295, filed Aug. 13, 2012.
File History of U.S. Pat. No. 8,577,003, U.S. Appl. No. 13/009,483, filed Jan. 19, 2011.
Henry, M., "Unethical staff behavior," Corrections Today, vol. 60, No. 3, Jun. 1, 1998.
International Search Report arid Written Opinion directed to International Patent Application No. PCT/US2017/031321, dated Jul. 14, 2017; 13 pages.
Jeff Hewett and Lee Dryburgh, Signaling System No. 7 (SS7/C7): Protocol, Architecture, and Services (Networking Technology) at 85 (Cisco Press, Jun. 2005).
Joint Claim Construction and Prehearing Statement, Exhibit B: Securus' Intrinsic and Extrinsic Evidence Charts, *Global Tel*Link Corporation* v. *Securus Technologies, Inc.*, No. 3:14-cv-00829-K (N.D. Tex.), Sep. 26, 2014.
Maghan, J., "Intelligence Gathering Approaches in Prisons," Low Intensity Conflict & Law Enforcement, vol. 3. No. 3, 1994, pp. 548-557.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive. org. on Nov. 4, 2013.
Photocopy of "Bellcore Notes on the Networks (Formerly BOC Notes on the LEC Networks)," Bellcore, Special Report SR-2275, Issue 3, Dec. 1997.
Procops, T., "Advanced call logging for public safety organizations," Public Management, vol. 82, vol. 3, Mar. 2000, pp. 17-19.
Prosecution History of U.S. Appl. No. 11/045,589, filed Jan. 28, 2005.
Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983.
Science Dynamics, Inmate Telephone Control Systems, http://scidyn.com/fraudprev_main.htm (archived by web.archive.org. on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web. archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Shearer, G., "How logging and monitoring technologies improve quality in a call center," Telemarketing & Call Center Solutions, vol. 16, No. 7, Jan. 1998, pp. 92-101.
Smith, M., "Corrections Turns Over a New LEAF: Correctional Agencies Receive Assistance From the Law Enforcement Analysis Facility," Corrections Today, Oct. 1, 2001.
Sundstrom, K., "Voice over IP: An Engineering Analysis," Master's Thesis, Department of Electrical and Computer Engineering, University of Manitoba, Sep. 1999.
U.S. Appl. No. 12/103,138, "System and Method for Authorizing and Monetizing Collect Cellular Telephone Calls," to Smith et al., filed Apr. 15, 2008.
U.S. Appl. No. 13/449,308, "System and Method for Authorizing and Monetizing Collect Cellular Telephone Calls," to Smith et al., filed Apr. 17, 2012.
U.S. Appl. No. 15/288,520, "Electronic Messaging Device," to Hodge et al., filed Oct. 7, 2016.
U.S. Appl. No. 60/036,689, filed Jan. 31, 1997, titled Database Origami.
U.S. Appl. No. 60/246,070, "Employee Online Activity Monitoring System," to Mcfarlane, et al., filed Nov. 7, 2000.
U.S. Appl. No. 60/500,725, "SMS Message Processing," to Claudatos, filed Sep. 4, 2003.
U.S. Appl. No. 60/607,447, "IP-based telephony system and method," to Apple, et al., filed Sep. 3, 2004.
Web pages from "Electronics Message Solutions Inc. (EMS): Improving Relationships through faster Correspondence," 2004, 9 pages; retrieved from http://www.inmatemail.com.
Wenndt, et al., "Content recognition for telephone monitoring," Proceedings of the SPIE—The International Society for Optical Engineering, vol. 4232, 2001, pp. 274-280.
Wireless Interconnection and Reciprocal Compensation Agreement Between Community Telephone Company and United States Cellular Corporation, Apr. 24, 2006; 29 pages.
Definition of "circuit switching", Newton's Telecom Dictionary, 10th Edition, 1996.
"Criminal Calls: A Review of the Bureau of Prisons' Management of Inmate Telephone Privileges," U.S. Department of Justice, Office of the Inspector General, Aug. 1999.
"Why Can't You Make a Collect Call to a Cell Phone," National Public Radio, Jun. 30, 2008, Accessed via http://www.npr.org/templates/story/story.php?storyId=92021561 on Apr. 6, 2015.
1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.
1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.
Ahimovic et al., "Services for Tomorrow's PCS," IEEE International Conference on Universal Personal Communications, vol. 1, Oct. 12-15, 1993; pp. 222-227.
Assignment of U.S. Pat. No. 8,190,121 and U.S. Appl. No. 13/449,308.
Brown, et al., "SMS: The Short Message Service," Computer, vol. 40, No. 12, 2007.
Confalone et al., "Calling Card Service—TSPS Hardware, Software, and Signaling Implementation," The Bell System Technical Journal, Sep. 1982, vol. 61, No. 7; pp. 1675-1714.
File History of U.S. Pat. No. 8,190,121, U.S. Appl. No. 12/103,138, filed Apr. 15, 2008.
File History of U.S. Pat. No. 8,626,118, U.S. Appl. No. 13/449,308, filed Apr. 17, 2012.
Reexamination U.S. Appl. No. 90/012,802 of U.S. Pat. No. 8,190,121, filed Mar. 1, 2013.
Final Office Action for U.S. Appl. No. 11/045,590, dated Dec. 9, 2009; 24 pages.
Final Office Action for U.S. Appl. No. 11/045,590, dated Jan. 21, 2009; 21 pages.
Final Office Action for U.S. Appl. No. 11/045,590, dated Oct. 25, 2011; 23 pages.
Final Office Action for U.S. Appl. No. 14/626,781, dated Jul. 27, 2016; 10 pages.
Garner, et al., "Mobile Terminated SMS Billing—Exploits and Security Analysis," IEEE International Conference on Information Technology: New Generations, 2006.
International Search Report and Written Opinion directed to related International Patent Application No. PCT/US2016/018653, dated May 30, 2016; 11 pages.

(56) References Cited

OTHER PUBLICATIONS

McKitterick et al., "State of the Art Review of Mobile Payment Technology," Department of Computer Science, Trinity College Dublin; 22 pages.
Non-Final Office Action for U.S. Appl. No. 11/045,590, dated Apr. 12, 2011; 21 pages.
Non-Final Office Action for U.S. Appl. No. 11/045,590, dated Apr. 2, 2008; 15 pages.
Non-Final Office Action for U.S. Appl. No. 11/045,590, dated Jun. 3, 2009; 22 pages.
Non-Final Office Action for U.S. Appl. No. 13/967,076, dated Jan. 15, 2015; 7 pages.
Non-Final Office Action for U.S. Appl. No. 14/626,781, dated Jan. 13, 2017; 11 pages.
Non-Final Office Action for U.S. Appl. No. 14/946,361, dated Feb. 8, 2017; 9 pages.
Notice of Allowance for U.S. Appl. No. 11/045,590, dated Apr. 12, 2012; 8 pages.
Notice of Allowance for U.S. Appl. No. 13/584,295, dated Apr. 8, 2013; 8 pages.
Notice of Allowance for U.S. Appl. No. 13/967,076, dated May 8, 2015; 7 pages.
Operator Service System Generic Requirements, OSSGR, TR-TSY-000271, Collect Billing, Rev. 3, Mar. 1988; 50 pages.
Schwartz, et al., "How to Build an SMS Service," O'Reilly Short Cuts, 2007.
The Line Information Database (LIDB) and Wireless Services, Telcordia Technologies White Paper, Dec. 2001; 31 pages.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.
Valcourt, et al., "Investigating mobile payment: Supporting technologies, methods, and use," IEEE International Conference on Wireless and Mobile Computing, Networking, and Communications, 2005.

\* cited by examiner

MESSAGE EXCHANGE

CROSS-REFERENCE TO RELATED APPLICATIONS

This application is a Continuation of U.S. application Ser. No. 14/626,804, filed Feb. 19, 2015, now U.S. Pat. No. 9,876,915, issued Jan. 23, 2018, which is a Continuation-in-Part of U.S. application Ser. No. 13/967,076, filed Aug. 14, 2013, now U.S. Pat. No. 9,282,188, issued Mar. 8, 2016, which is a Continuation-in-Part of U.S. application Ser. No. 13/584,295, filed Aug. 13, 2012, now U.S. Pat. No. 8,515,031, issued Aug. 20, 2013, which is a Continuation of U.S. application Ser. No. 11/045,590, filed Jan. 28, 2005, now U.S. Pat. No. 8,243,891, issued Aug. 14, 2012, which are incorporated by reference herein in their entirety.

FIELD OF INVENTION

The present invention relates generally to the field of telephone communication systems in penal institutions or similar facilities. In particular, the present invention relates to a system and method for improving communication between an inmate and a third party by enabling the inmate to leave a message when a call is not answered and further allowing the third party who receives the message to reply with a message to the inmate. Further, the present invention enables authorized third parties to access the system and leave messages for inmates even if the inmate has not left a message for the third party.

BACKGROUND OF THE INVENTION

Generally, the need to monitor, control, record and provide detailed records of the usage of a telephone system in a controlled institutional environment is well recognized. It is common to utilize a controlled telephone system capable of monitoring outgoing telephone connections in many types of institutional environments, including penal institutions, military institutions, hospitals, schools, businesses, specific types of government institutions, etc.

The reasons for monitoring and controlling institutional telephone systems are evident. To prevent such institutions from incurring unaccountable telephone costs, the institutions must either restrict access to outbound telephone lines or employ a telephone monitoring system to charge the responsible party for making the outbound communication. Otherwise, unaccountable telephone costs would severely hinder the availability of the telephone systems in institutions. However, the restrictions utilized by these systems result in overall inefficiency as two-thirds of the attempted calls go unanswered presenting a problem for both the system's users and the institution.

It is imperative for many institutions to utilize a communication system that provides an accurate identification means for administrators to determine the individual responsible for each outbound telephone call. A communication system must also provide a monitoring means for maintaining a useful record of the communication. Additionally, the system should include a means for restricting access or a means for providing options to particular users. Considering the number of users in a large institution, different payment methods available, and the excessive call volume at many institutions, it is evident that an effective telephone management system is essential.

Providing telephone systems in specific types of highly restricted institutions, such as penal institutions, results in the consideration of numerous additional complicating factors. Generally, the government heavily regulates outbound communication means in penal institutions. Therefore, communication systems implemented in penal institutions or similar facilities must meet greater security requirements often mandated by regulatory bodies affiliated with the county, state, or federal institution. Thus, the communication system used in a regulated institution must employ unique functions often unnecessary in other types of institutions.

In its most general form, a penal institution's telephone system utilizes a call processor to approve and place a call, surveillance equipment or monitoring equipment, and a recording device for evidencing the conversation. Generally, these simple systems are not equipped to restrict an inmate from calling an individual. However, it is preferable for the call system devices now employed in such institutions to have the capability to thwart an inmate from calling certain specific individuals or types of individuals. Systems currently exist capable of controlling calls. It is well documented that without the necessary constraints on an inmate's use of the telephone system, inmates have often harassed outside parties or individuals. For example, it is generally preferred that an inmate be prevented from placing a telephone call to the prosecutor who prosecuted the inmate's case or another attorney responsible for the sentencing of the inmate. In another example, it may be preferred that an inmate be prevented from contacting the victim of the inmate's crime or witnesses from the inmate's case. Additionally, inmates have used previous penal institution call systems to perpetrate additional criminal activities such as fraudulent schemes or specific criminal conspiracies. Specifically, inmates have been known to arrange credit card fraud attempts, the smuggling of contraband into the facility, and have even been known to arrange escape attempts over the penal institution's telephone system. Therefore, it is critical in an efficient penal institution to carefully monitor all outgoing telephone calls making a regulated penal institution telephone system a necessity.

Another concern in implementing an efficient institution telephone system is cost control. In order for a system to be cost effective the system must critically monitor and record the activities of each individual user to properly charge each individual caller for his or her outgoing calls. Typically, telephone communication systems in penal institutions provide an inmate with a telephone account upon arrival. There are several options for an inmate to select with respect to payment on the account. For example, an inmate may place prior personal earnings into the account. The cost of each call is then deducted from the total amount in the inmate's account until no balance remains. The inmate may also choose to utilize collect call means. In addition, an inmate may be assigned a commissary account, where funds are added to the account based on work performed by the inmate. As the funds increase, the inmate may apply these funds to the cost of placing telephone calls. The inmate debit account may be located onsite, at a central office facility, or at a third-party site.

The inmate's family may alternatively control the inmate debit account. For example, the inmate's family may control the inmate's access to the debit account either remotely (e.g., by using the Internet, accessing a toll-free/pay to dial telephone number, using a mail form, etc.) or by visiting the prison facility. The inmate's family may add funds to the debit account and thereby control the call volume allowed to the inmate.

Another requirement of a secure telephone management system in a penal institution is the accurate identification of the telephone call participants. Generally, it is common in a penal institution to assign each inmate a personal identification number ("PIN"). When an inmate attempts to place a telephone calls the inmate must supply a valid PIN to gain access to the telephone system. Other systems include requiring personal information in addition to a PIN to be supplied by the inmate/user. For example, a user might be prompted to supply a PIN as well as certain information that may only be known to the user. A common example is a request by the call system to provide their mother's maiden name.

Another required feature of a telephone management system for a penal institution or similar facility is a means for restricting calls placed by a user (e.g., an inmate). It is well documented that inmates often try to harass individuals related to their arrest or confinement, such as judges, prosecutors, witnesses, etc., through telephonic communications. Penal institutions have attempted to prevent this harassment by restricting the telephone numbers each inmate is able to access. For example, a system may utilize a PIN or other identification means to access a list of telephone numbers that the inmate may not call, or alternatively, the system may access a list of numbers that the inmate is authorized to connect to (i.e., the inmate can only call the numbers appearing on the list). Telephone numbers placed on the restricted list can include any individual related to the conviction (e.g., the arresting police officer, the prosecuting attorney, etc.), while telephone numbers placed on the permitted list may include, for example, close family relatives. The system may also limit the amount of time each inmate/user is permitted to conduct each outbound telephone call through the system. Furthermore, restrictions may be regularly updated. For example, if an inmate misbehaves, the inmate's telephone privileges may be further limited or revoked completely.

Penal institutions are also concerned with monitoring the activities and communications of inmates. Monitoring telephone activities is necessary to restrict connections to illegal activities outside of the institution.

Three existing types of call monitoring techniques are known in the art. The first technique is live monitoring. Live monitoring requires an operator or other individual to listen to each telephone call and alert the proper authorities if necessary.

The second type of monitoring involves recording the telephone conversation via a common recording device. A common example is a recording device such as a magnetic tape drive or a computer hard drive. This type of monitoring may be continuous or intermittent depending on the degree of security required for each inmate.

The third type of monitoring is known as passive monitoring. Passive monitoring may be activated when certain keywords are spoken. In addition, passive monitoring may be activated if the telephone call at the termination end is transferred to a third party via certain known detection means such as silence detection, hook-flash detection, etc.

Penal institutions currently record most inmate telephone calls, with the exception of lawyer-inmate communications, which are generally prohibited by law. Typically in the art, monitoring may occur using any combination of the three methods (e.g., live monitoring, electronic recording monitoring, or passive monitoring). It can be advantageous to flag certain individuals in an inmate's profile as highly suspicious. If the inmate initiates communication with the flagged individual, the system will alert a live operator to monitor the system. In such a system it is essential that the system correctly identify the called individual to avoid unnecessary expenditure of live operators.

Alternatively, the inmate telephone call system may utilize a remote alert notification system wherein the system contacts an operator when a violation has occurred. The system may contact the operator utilizing telephone means, paging means, computer means, etc. This notification system may be set to call the operator a limited number of times or until the alert has been noted in the inmate telephone call system. The operator may then access information about the alert remotely using the telephone, Internet, or any other such remote access means.

In order to alleviate some of the problems and concerns discussed herein, many penal institutions have implemented certain task-specific advanced systems. Generally, these "advanced" systems known in the art comprise several features.

For example, it is known in current systems to employ permanent call blocking. Specifically, it is known in the art to block an inmate or group of inmates from dialing certain telephone numbers. Most systems also prevent inmates from talking directly to live operators. This prevents inmates from requesting that the operator forward a call or provide additional telephone numbers allowing inmates to harass or locate additional parties. Furthermore, current systems block "1-800," "1-900" and other like telephone numbers including toll-free and pay-to-dial telephone numbers. In addition, certain institutions may elect to block country codes, specific area codes, or other third-party numbers.

Current systems known in the art may also utilize a feature commonly referred to as "selective" call blocking. As discussed, "selective" call blocking may be employed to thwart inmates from establishing a connection with a selected group of individuals (i.e., with the home telephone of prison guards, wardens, indictment witnesses, trial witnesses, police officers, judges, etc.). It is also foreseeable that the telephone numbers of the family members of these specific individuals may also be blocked.

Some current systems also limit the use of specific long-distance carriers. This feature proves useful in limiting unnecessary costs incurred by employing alternate carriers.

Several current systems utilize features commonly referred to as "hook flash" prevention or "click" and "pop" prevention modes. These systems prevent inmates from extending the current outgoing telephone call and entering a new telephone call with a new number without fully terminating the original telephone call. For example, this feature prevents an inmate from utilizing common call forwarding features and the like.

In addition, some current institutional telephone systems electronically or manually disable the keypad after a telephone number is dialed and the telephone call is connected. This feature prevents inmates from interacting with telephone games and lotteries, and in certain older systems, prevents the inmate from achieving an unrestricted dial tone.

Another common feature employed by institutional systems is three-way call prevention. This feature prevents an inmate from instructing the called party to bridge the telephone call to another telephone number.

Other known systems in the art may exhibit other regulatory features. For example, telephone communication systems generally allow an institution to limit the duration of a telephone call or to limit the cost of the telephone call. These types of features further allow a facility to customize the telephone call systems thereby preventing unrecoverable expenditures.

Another control used by current institution telephone systems is the use of certain aspects of biometric recognition for the identification of users or inmates (i.e., the calling party). It is highly beneficial for communication systems in penal institutions to incorporate biometrics as an additional security device. Biometric recognition is commonly available in a number of fields. For example, biometrics recognition has found a number of security uses, including common usage, in credit card systems and building security systems. Biometric information includes fingerprints, hand geometry, voiceprints, retinal patterns, iris scans, signatures, infrared facial patterns, and all other sources which constitute unique physiological characteristics and which can assist in establishing a person's identity. Various devices exist which can scan one or more biometric characteristics and digitize the information.

Generally, while much effort has been made to establish controlled inmate telephonic communication, inmate call management systems are inefficient. Studies have shown that approximately two-thirds of all calls attempted by an inmate to an outside party are not answered by a live party (i.e., no answer or an answer by an automated message machine such as voicemail or an answering machine). These unanswered calls present a problem for inmates as they often count against their monthly limit thereby reducing the time available for inmates to talk to such people as family members. Currently, the Federal Bureau of Prisons (FBOP) has a three hundred (300) minute per month limit for many inmates. It may take the inmate several attempts to successfully contact an outside party or the inmate may never successfully contact a desired outside party.

Also, inmates and their outside contacts often complain of the difficulty to communicate via live telephone conversations as they are often several time zones away from each other. Due to the lack of successful completions of calls (i.e., only one-third of attempted calls are successful), inmates try to find a way to get around the system resulting in even more restrictions placed on usage of the system. Additionally, these unanswered calls present a loss of revenue for the institution, as it is difficult to charge for system usage if the call is not answered.

A system is thus desirable that provides means for inmates and their families, etc. to communicate more easily whereby inmates can leave a message for the outside party when calls are not answered. The system should allow the outside party who receives the message to reply with a message to the inmate. Also, the system should enable authorized outside parties to access the system and leave messages for the inmate at any time even when an inmate has not left a message for the outside party. Not only would the efficiency of use increase, but also an additional revenue stream for the institution from the inmates/outside contacts who utilize the system would be generated. However, due to factors such as government regulations, such a system must be monitored and controlled in similar manners to current call management systems. The system should also allow for live talk between the inmate and outside party if the outside party answers the call, record the conversation as necessary, bill for usage of the system, etc.

One system known in the art discloses an automatic account number validation and billing management system. The system prompts a user for an account number and compares the number inputted to a number stored in a database to determine validity. If the account number is valid and found in the database, the system completes the predetermined telephonic connection. If the number is not in the database, and therefore invalid, the system will utilize voice prompts to request re-entry of the number or provide further instructions. The system attempts to locally automate and simplify the process of payment for routing calls without live operator assistance, but does not address additional security concerns that may exist in specific facilities, such as in a penal institution. Furthermore, it does not provide for protection measures to confirm that the individual supplying the account number is the individual entitled to the use of the account. In such a hostile environment as a penal institution, an account number may easily be obtainable through coercion or by force. The system does not provide any means of monitoring the conversations taking place or restricting which individuals are accessed by the user. Additionally, the system does not provide means for voice message exchange resulting in overall inefficiency.

Another system known in the art discloses a call management system enabling prepayment of telephone calls utilizing a debit system. Specifically, a user of the system obtains a special code by depositing a prepayment. The prepayment is stored in a database for use in verifying calling party calls. To access the system, a user dials a special number and inputs a user-specific code for verification followed by the number of the party to be called. Next, the code is verified by the system. If verification is successful and sufficient funds are available, the call is connected. The prepayment amount, minus deductions for the running cost of the call, is tabulated as the call progresses. The call terminates either when the prepaid funds are exhausted in the user's account or when either party disconnects. The invention also includes steps to prevent the same access code from being used at different terminals. However, the system does not teach a means for selecting the call type or a call monitoring means. It also fails to teach an advanced verification means specific to a user. Further, it does not teach voice message exchange if one of the parties is not available.

Yet another system known in the art teaches a multilingual prepaid telephone system capable of interfacing with a public switched telephone network (PSTN). In the system, each user is assigned a Personal Identification Number (PIN) and a credit account. A user first dials a number to access the telephone system and chooses a language for all subsequent voice prompts. The user then supplies a PIN, which is compared against a list of numbers in a database. If sufficient credit is available for the duration of a telephone call to the destination number, the connection is completed and a timer is set for the available duration of the call. The call terminates either when the allowed amount of time for the call expires or if one party member hangs up the telephone line. If the latter situation occurs, the system computes a new available credit balance for the user's account. However, the system fails to provide a selection means for the user, such as the ability to choose the type of call to be placed (e.g., collect, debit, international, etc.). It also fails to teach any call monitoring means and would therefore be unacceptable as a communication system for a penal institution. Additionally, it does not teach any voice message exchange means.

Still another system discusses an integrated commissary system for receiving and processing orders in an institutional setting. The commissary system is designed for use without access to a PSTN. According to the system, user status and inventory status are stored in an onsite database. To access the database, a user provides identifier information and item selections through selected telephones. The selections are compared against the onsite database using a processor. If the user is authenticated and the requested items are available, the processor generates transaction records, updates user commissary information, and correctly adjusts inventory. The updated information is stored in a file that may be used for record keeping or archival purposes. However, the system does not teach a commissary system for use with a PSTN or any voice message exchange means. This system also fails to teach multiple authentication means and would therefore be unacceptable for use in a penal institution. Additionally, the system does not include means for voice message exchange making the system inefficient.

Still a different system known in the art discloses a software process for real-time call rating and debiting so that a subscriber's account balance is not exceeded. The method disclosed estimates the time when the user's balance will expire by using the total charge per second average. The process then determines the time remaining by dividing the account balance by the average charge per second of all telephone calls, and the time limit for the call is then set accordingly. This method is useful if the rate for long distance calls is not known locally. However, the system does not allow for other types of calls, such as collect calls, to take place. Further, it fails to provide an advanced call monitoring apparatus with an advanced authentication apparatus. Also, it fails to teach a voice message exchange system.

There is also a system that depicts an automated public telephone control for charge or collect call billing. The apparatus embodies a microprocessor system controlling voice prompting, recognition of responses, network signaling, recording of calling details, and verification of account numbers. The disclosed invention provides for an automated telephone billing for public telephone systems. The system offers a plurality of billing methods, such as billing to a credit account number, to the called party (collect calling), or to a third party. An additional aspect of the invention describes the recognition of voice utterances from other signals and called party spoken words (i.e., the system can recognize the word "yes" when spoken by any individual). However, it does not identify or verify the individual speaking. Furthermore, this system does not provide a means to identify the user or verify that the user is not partaking in fraudulent activities. It also fails to teach of a monitoring, call control, and voice message exchange.

Yet still another system depicts a collect call system that can automatically route long distance calls without intervention of an outside service or operator. This feature enables private public telephone owners, as opposed to primary telephone companies, to receive revenue for completion of the call. The invention comprises the steps of providing the calling party with voice prompts, receiving voice or dialed signal information about the calling party in response to the voice prompts, locally recording the information about the calling party, providing the called party information about the calling party, and reacting to a variety of provided signals by either the called or calling party. The system only provides a method and apparatus for placing collect calls. In addition, it avoids consideration of providing other possible payment methods. The system disclosed is further limited by its lack of telephone call monitoring ability and calling party identification means, and is therefore unsuitable for use in penal institutions.

Still a different system exemplifies the need for a control management and monitoring system in institutional settings. This system discloses a system for controlling, monitoring, recording and reporting telephone communications. The system deals primarily with the identification of a user through use of a PIN and restricting telephone communications through a profile accessed by the PIN. The system further contemplates means for monitoring and recording communications. However, the system only enables live talk between parties and provides no means for voice message exchange.

Even another system is primarily concerned with incorporating an improved method of monitoring calls. The method includes a means for detecting tones commonly associated with call bridging and call forwarding attempts. For example, the system is directed to the detection of tones such as ring signals, busy signals, special information tones ("SIT"), dual tone multi-frequency ("DTMF") tones, call progress tones or other similar tones characteristic of the placement of a telephone call. It is limited by detection of certain sounds, which may not be readily machine-recognizable. For example, it is foreseeable that interference, background noise, or compressed voice data may inhibit the detection of the tones. Also, the system does not teach any method for voice message exchange.

Another system known in the art describes a system for the verification of a calling party, called party and a secure connection. The invention includes the costly requirement of secure telephone devices known in the art. Specifically, the invention teaches a system wherein the calling and called parties supply voice data, which is encoded and transmitted over a telephone network. Both users hear the alternate party's recorded voice data and verify that the supplied voice data is correct. The call is established only if both parties verify that the called party has provided the correct voice data. However, it would be too costly to implement such a system in a penal institution or similar facility. Additionally, the system does not consider possible payment methods for calls or call management. For example, certain inmates may be entitled to call only a few particular individuals. A system within penal institutions, or similar facilities, must include a means for limiting the number of potential called parties and the specific parties to which inmates can call and provide a means for monitoring inmate call transactions.

Further, a different system discloses a system to permit users repetitive access to a multitude of systems. The system requires an initial enrollment phase for access. The enrollment phase consists of extracting biometric data to be stored for future use. The format of the data is compatible with a plurality of verification/identification systems. For example, in one embodiment, it describes a biometric recognition means including voice recognition, fingerprint identification, and retinal scan identification. However, it does not address restrictions to the system or further monitoring means during use of the system, which are essential for systems within a penal institution.

Finally, a system known in the art provides a methodology for a computerized telecommunications system for voice to text message storage for use in correctional facilities. This system receives an external message via either voice or text. There are two storage means: a voice message box or an email inbox. If a voice message is received, it passes as a regular telephonic voice message is then stored as a voice message in the voice message box. If instead the storage unit is an email box and a voice message is received, the voice message is converted to text and the message is then saved. The reverse happens if the message is a text message and the storage medium is a voice message box. If a text message is received and the inmate has an email inbox, the text message is saved as text. The inmate is then notified of the new message. This system can also allow the inmate to send either a text or voice message to an external party. If the inmate leaves a voice message, no conversion occurs and the message is sent. However, if an inmate's message is in text form, either a text to voice conversion occurs before being sent to the outside party or the text message is sent via email to the external party. This system requires an external party have access to the system to receive a message sent by an inmate. The external party must constantly check the system to determine whether they have new messages. Only upon accessing the system is the external party notified if there are any new messages. Further, the system requires that the inmate choose either to leave a voice message or attempt a live call. These drawbacks severely limit the system's functionality making it both inefficient and difficult to implement into institutional settings.

In view of the foregoing, there clearly exists a need for an improved method and apparatus for increasing the efficiency of an institution's telephone call system. Furthermore, there clearly exists a need for an improved telecommunication system for use in penal or similar institutions that incorporates the ability to handle calls not answered by a human, whether the calls are unanswered or answered by an automated message device. Additionally, the system should allow outside parties to leave messages for users within the institution. There exists a need in the art to incorporate these new features to provide a more efficient telecommunication system with the capacity to allow an institution to control, bill, record, monitor, and report usage and access to a telephone network.

SUMMARY OF INVENTION

The present invention embodies a voice message exchange system for use in controlled call management systems. One such call management system is found in co-pending U.S. application Ser. No. 10/215,367, incorporated in its entirety herein by reference. The system includes control, monitoring, recording, and reporting means for an institutional based telecommunication network and may further implement a debit card platform or other such payment methods. The system of the present invention may be implemented in a variety of facilities including penal institutions or similar facilities such as mental institutions, nursing homes, rehabilitation centers, correctional facilities, government agencies, private and public businesses, and the like.

The present invention provides inmates with the ability to leave messages when calls are not answered by the called party (i.e., an automated answering device such as an answering machine or a voice mailbox answers or the call goes completely unanswered). Additionally, the present invention allows the called parties (i.e., outside contacts who receive messages from inmates) to reply with messages to the appropriate inmate. The present invention is advantageous for both the institution and the inmates. It is not possible for an institution to charge for unanswered calls. The present invention solves this problem and thus provides an additional revenue stream for the institution from the inmates and their contacts that use the system (i.e., reduces the institution's losses on unanswered calls). From the inmates' perspective, it becomes much easier to communicate with outside contacts by substantially improving the efficiency of institutional call management systems. The inmates and outside contacts can maintain contact when inmate calling schedules conflict with outside contact schedules. Further, the present invention enables inmates with call limits to leave messages stating when they can be reached. Advantageously, easier and more efficient communication has been found to foster less agitated behavior and help in an inmate's rehabilitation process.

Institutional call management systems generally require acceptance from the called party before allowing the caller to communicate with the called party. However, in current call management systems, when an inmate places a call and a call is answered by an automated answering device or the call goes unanswered, the inmate cannot leave a message because, among other things, the automated answering device cannot enter the positive acceptance digit required by institutional call management systems (i.e., "If you would like to accept this call, press 1."). Upon no answer or an answer by an automated answering device, the present invention provides the caller (i.e., an inmate) with the option to leave a message. If the inmate chooses to record a message, the system automatically continues contact attempts with the dialed number at set time intervals until the system successfully makes contact with the called party or until a maximum number of attempts is reached. If a maximum number of unsuccessful attempts occurs, the system stores the message and when the called party accesses the system, message playback takes place.

Upon making contact with an automated answering device or a live person, the system plays the message followed by instructions enabling the called party to leave a return message for the inmate. When the called party chooses to leave a return message, the system prompts the called party to enter his or her pre-existing account information or set up a new account. Once the called party enters the proper account information or sets up an account, the called party leaves a message after which the inmate is notified. Also, an outside contact meeting the requirements set forth by the institution for communicating with an inmate can access the system at any time and leave a message for that inmate.

Preferably, the appropriate account is charged on a per message basis for usage of the system. However, several other methods for billing for usage of the system may be utilized, including, but not limited to, deducting the funds on a length of message basis, charging a monthly service fee, deducting funds based on a per minute fee, or charging a monthly base fee plus a deducting funds on a per minute basis. Additionally, prepaid accounts are preferably created that allows for billing for system usage based on the aforementioned methods.

Therefore, it is an object of the present invention to provide a more efficient call management system for use in penal institutions and the like.

It is another object of the present invention to provide a method for allowing inmates to leave messages for called parties when the call placed by the inmate is unable to be completed.

Still another object of the present invention is to provide security authentication for users of the system.

A different object of the present invention is to enable outside contacts to leave a message for the inmate.

Additionally, an object of the present invention is to alert the inmate and/or outside contacts of a new message.

Further, it is an object of the present invention to enable outside contacts to block calls or messages from an inmate.

It is also an object of the present invention to monitor and record communication between an inmate and outside contacts.

Still a different object of the present invention is to perform a security check on sent and received messages. Yet another object of the present invention is to provide a billing means for usage of the system.

It is further an object of the present invention to enable outside parties to set up an account.

Finally, it is an object of the present invention to enable the voice message system to be easily incorporated into inmate telecommunication systems.

Other objects, features, and characteristics of the present invention, as well as methods of operation and functions of the related elements of the structure, and the combination of parts and economies of manufacture, will become more apparent upon consideration of the following detailed description with reference to the accompanying drawings, all of which form part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages, thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE DRAWINGS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention (in addition to some alternative embodiments).

Figure 1:
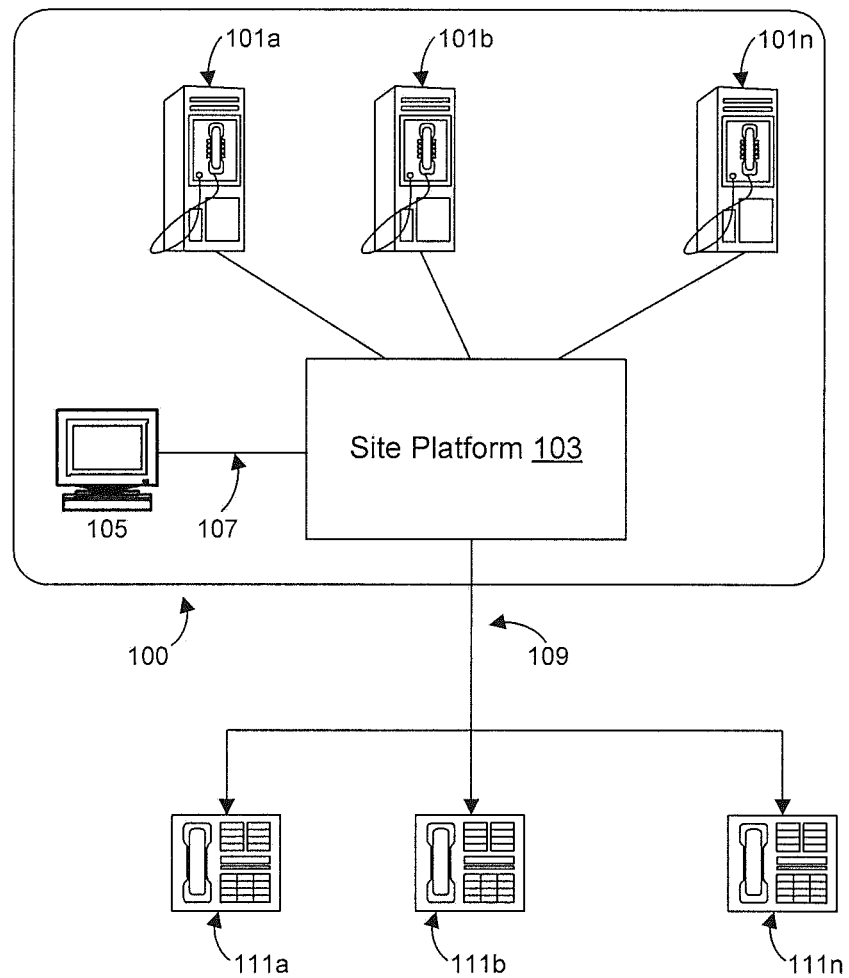
FIG. 1 depicts a block diagram of an example embodiment of an inmate call management system according to the present invention.

Referring first to FIG. 1, depicted is a block diagram of an example inmate call management system. One of skill in the art will recognize that the voice message exchange system of the present invention may be incorporated into any call management system. Additionally, it is foreseeable that the voice management system may be externally attached to the call management system or incorporated internally into the system depending on the requirements of the call management system in use. Thus, FIG. 1 is merely an example of a call management system and is not intended to limit the scope of the present invention.

Site 100 preferably includes telephonic instruments 101a-n, where "n" is an integer representative of the number of devices, site platform 103, and administrative workstation 105. When an inmate wishes to place a call, he or she picks up telephonic instrument 101a-n. The system, prompts for identification information such as a Personal Identification Number (PIN). Other identification means (not shown) may also be connected to telephonic instruments 101a-n. Examples of such identification means include Radio Frequency Identification (RFID) technology and biometric identification means (i.e., fingerprint scanner, retinal scanner, voice analyzer, etc.). Once the system identifies the inmate, the inmate is prompted to dial a number to make a call. Site platform 103 preferably includes at least one site server and at least one recorder (not shown). The recorder is preferably digital and serves two functions. First, the recorder records the conversations between an inmate and a contacted party as is known in the art. Second, the recorder records messages left by an inmate or an external party utilizing the voice message exchange system. The two functions can be performed by the same recorder or alternatively by two or more recorders (i.e., one for recording conversations and one for recording messages). The digital recorder preferably connects to a site server within site platform 103. The site server preferably stores information such as conversations, messages, call logs, account status, and other information about the inmate and contacts.

Administrative workstation 105 connects to site platform 103 via connection 107. Connection 107 is preferably a Local Area Network (LAN) connection, but other connections are foreseeable. Although only one administrative workstation 105 is shown, it is contemplated that multiple workstations 105 may be utilized by the system depending on institutional requirements. Also, while administrative workstation 105 is shown onsite, it is also possible to access site platform 103 via the Internet through a web browser. Workstation 105 enables an administrator and authorized personnel to access account information, monitor calls, perform searches, etc. In an embodiment, the searches can be word searches initiated either automatically or after either text or audio administrator input. For example, an administrator can provide an audio input of a desired word, and the system will search for that word in a monitored/recorded conversation. This search can be performed either on the audio conversation or on a text version of the conversation using the speech-to-text conversion. It is also foreseeable that the functions controlled by site platform 103 may alternatively be controlled remotely at a central platform.

Site platform 103 connects to remote telephonic instruments 111a-n via connection 109. Connection 109 may be a Public Switched Telephone Network (PSTN), Voice over Internet Protocol (VoIP) connection, etc. depending on the requirements of the system. Further, one of skill in the art will recognize that the illustration of connection 109 is shown in a simplified form.

Figure 2:
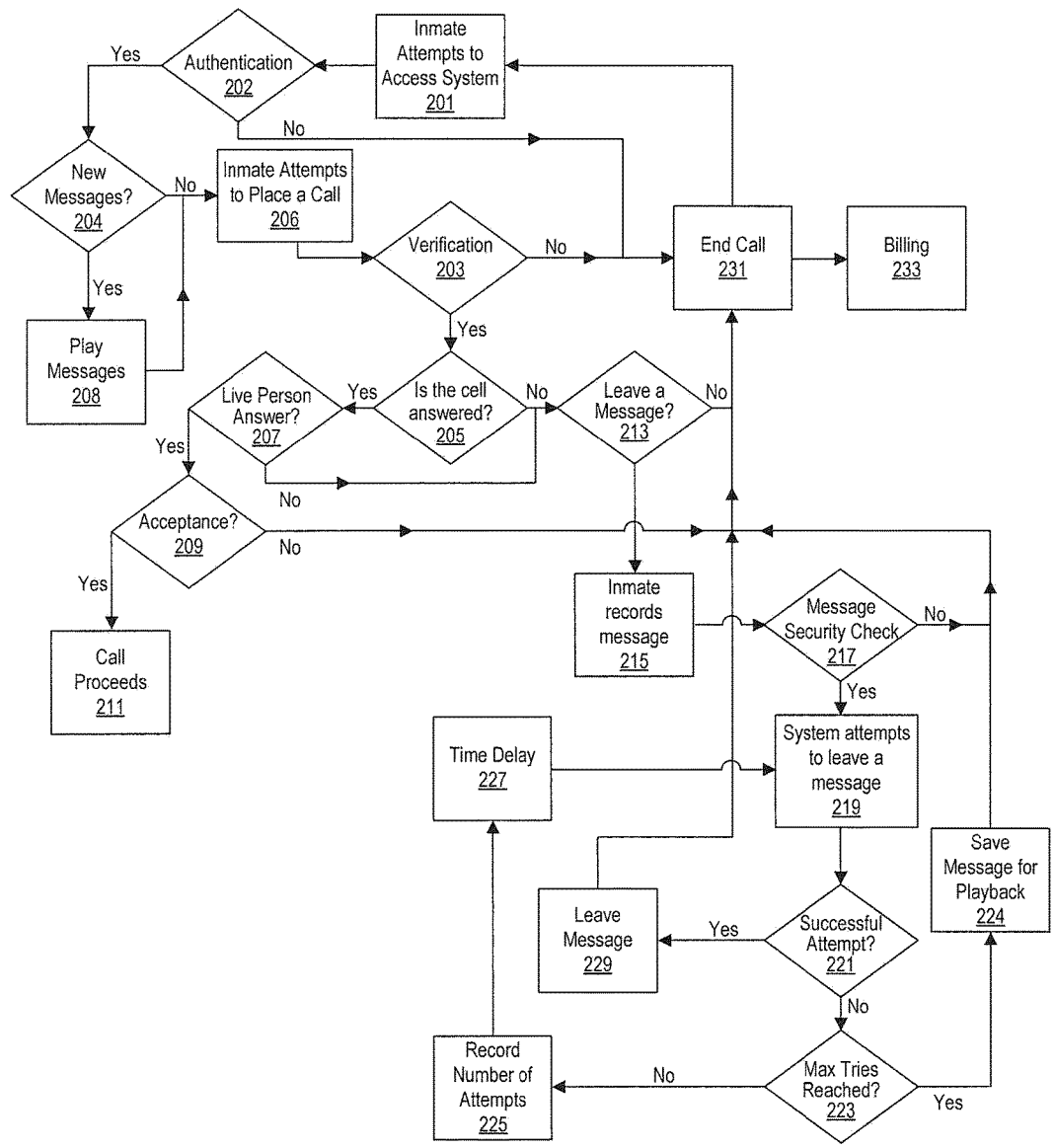
FIG. 2 is a flow chart depicting the preferred process of an inmate leaving a voice message for an external party according to the present invention.

FIG. 2 depicts a flow chart illustrating the preferred process whereby an inmate leaves a voice message for an external party according to the present invention. Initially, an inmate attempts to access the system (step 201). The system prompts for identification information. Authentication of the inmate is performed as is known in the art (step 202). For example, authentication may include the entering of a PIN number, using RFID technology, or utilizing biometric identification means. These authentication means may be used alone or in conjunction with any of the other authentication means. If the authentication tests are not passed, system access is denied and the call is ended (step 231). After the inmate successfully logs in, the system checks to see if the inmate has received any new voice messages (step 204). New messages are then played (step 208). After all the messages have been played or if there are no new messages, the inmate is prompted to make a call (step 206). Verification tests are then performed such as verifying that the number dialed is an authorized number, that the number dialed has not been called forwarded, etc. (step 203). If the attempted call fails the verification tests, the call attempt is ended (step 231) and the system bills for usage as appropriate (step 233). However, if the attempted call passes the verification tests, the call proceeds. The system attempts to make a connection with the dialed party and detects whether the call is answered (step 205). If after a set number of rings the call remains unanswered, the system prompts the inmate with the option to leave a message (step 213). If the call is answered, the system checks to see whether the call was answered by a live person (step 207). When a human answers the phone, the system preferably prompts for the called party to accept or reject the call (i.e., "Say or Press 1 if you would like accept the call."). If the call is answered by an automated answering device, such as an answering machine or a voice mailbox, the system gives the inmate the option to leave a message (step 213). Those skilled in the relevant art(s) will recognized that other methods may be utilized for identifying whether a person or an automated answering service answered the call, without departing from the spirit and scope of the present invention.

If the system determines that a live person answered the call (step 207), the system prompts the called party with an acceptance or rejection message (step 209). At step 231, the call is ended when the called party rejects the incoming call and the system bills for usage as appropriate (step 233). Further, the system enables the called party to block all future calls from the inmate. Upon acceptance of the call by the called party, the call proceeds under the institution's restrictions (step 211). The call is monitored for three-way call attempts, inappropriate conversation, etc. as is known in the art.

If an automated answering device answers the call or if there is no answer, the inmate is prompted with the option to leave a message (step 213). The inmate then chooses whether or not to leave a message. If the inmate chooses not to leave a message (or does not meet the necessary requirements to leave a message, i.e., possess the necessary account), the call is ended (step 231) and the system bills for usage as appropriate (step 233). When the inmate decides to leave a message, the system prompts the inmate to leave a message and the inmate records a message (step 215). The message is then checked for content, etc. (step 217). Messages that fail the security check result in the call ending (step 231). Once a message passes the security check, the system disconnects the inmate, dials the appropriate number and attempts to leave a message (step 219). After each attempt, the system checks to see if the attempt was successful and a message was left (step 221). When the system successfully reaches an automated answering device or when the call is answered by a live person, the system plays the recorded message and any other default messages as required by the institution (step 229), the call is ended (step 231) and the system bills for usage as appropriate (step 233). At this point, the called party is preferably given instructions for leave a message for the inmate. Upon unsuccessful attempts, the system checks to see if the maximum number of attempts has been reached (step 223). The system is configurable to make a maximum "n" number of attempts to try and leave a message. Once the system reaches the maximum number of attempts, the system saves the message (step 224) after which the call attempts are ended (step 231) and the system bills for usage as appropriate (step 233). When the called party accesses the system, the system will play the recorded messages (as shown in FIG. 3).

When the system finds that the maximum number of tries has not been reached (step 223), the system records the number of attempts (step 225). The system preferably utilizes an incremental counter whereby each time an attempt is made, the number of attempts increases by one. After a set amount of time has elapsed (step 227), the system again attempts to leave the message (step 219). This process continues until either the message has been left successfully or the maximum number of attempts has been reached, whichever comes first.

In an alternative embodiment, instead of leaving the inmate's actual recorded message on the called party's automated answering device, the system could leave a message stating that an inmate has recorded a message and gives the called party a number to dial to hear the recorded message. After the called party dials the number and completes the necessary authentication steps, the system plays the recorded messages and gives the called party an option to reply to the message. The system also provides the option to block future calls from the inmate.

Figure 3:
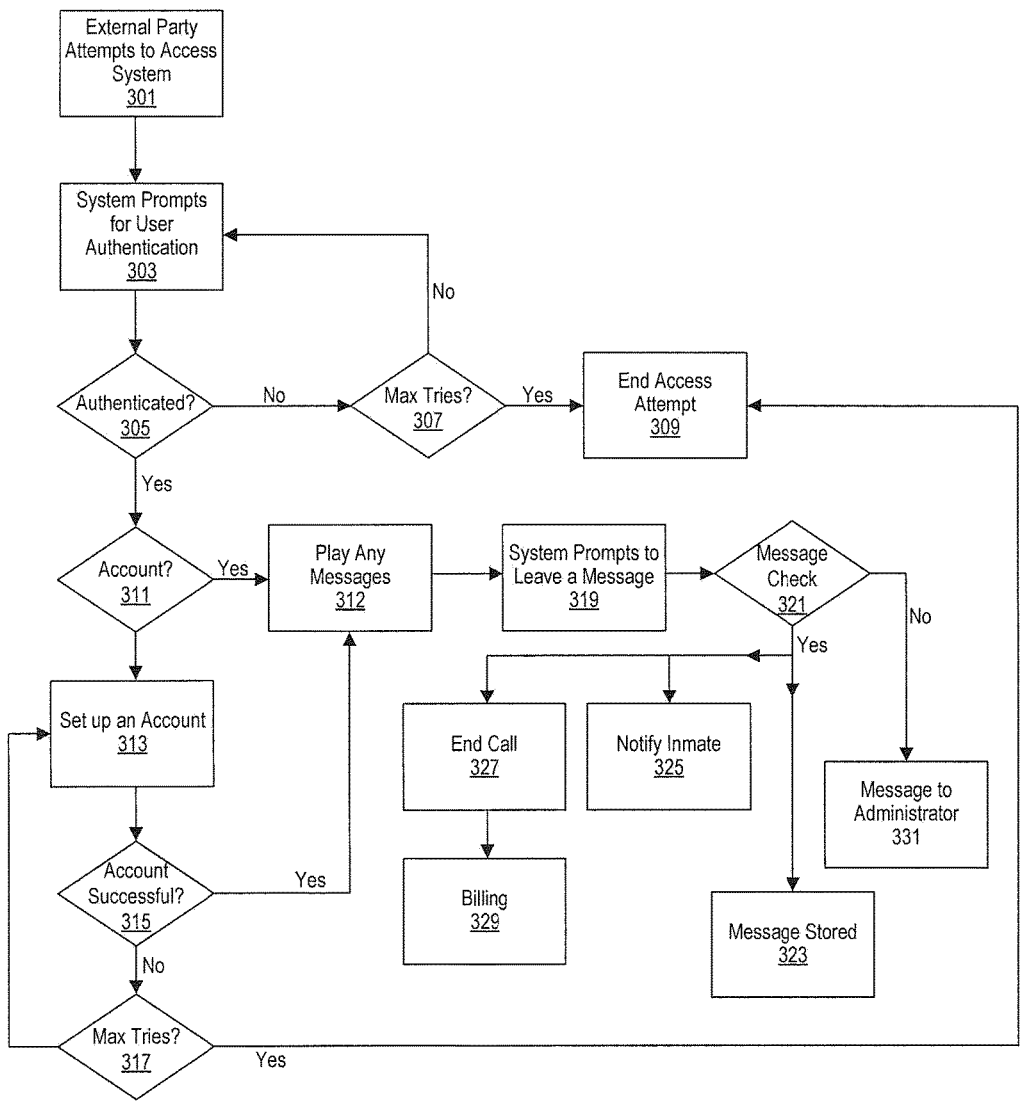
FIG. 3 is a flow chart depicting the preferred process whereby an external party accesses the system and leaves a voice message for an inmate.

Next, FIG. 3 depicts the preferred process according to the present invention whereby an external party leaves a voice message for an inmate. Initially, the external party attempts to access the system by dialing the proper system phone number (step 301). The system prompts for user authentication (step 303). If the user fails to be authenticated, the system denies entry (step 305). The system then checks to see whether the number of attempts to access the system matches the maximum number of attempts allowed by the system (step 307). Upon a match the attempt to access the system is terminated (step 309). If the maximum number of attempts has not yet been reached, the system again prompts the user for authentication (step 303).

When the user is authenticated, the system then prompts for account information (step 311). If the user does not have a pre-existing account, the system takes the user through a series of steps to set up an account including setting up billing means and properly identifying which inmates the user desires to communicate with (step 313). The system checks to see if the account was successfully set up (step 315). The system then checks to see whether the number of attempts to set up the account matches the maximum number of attempts allowed by the system (step 317). If the maximum number of attempts has not been reached, the system again prompts the user to set up an account (step 313). When the maximum number of attempts is reached, the system terminates the access attempt (step 309).

After the user successfully set ups an account (step 315) or if the user had a pre-existing account (step 311), the system plays any messages that an inmate has left for the user (step 312). At step 319, the system prompts the user to leave a message after the messages have been played or when there are no messages. The message is then checked for such things as content (step 321). If the message fails the check, the message is sent to the administrator (step 331). Once sent the administrator (step 331), the administrator can review the message and approve/disapprove the check determination. In other words, the administrator can deem the message to be content-acceptable even after the message has failed the content check. Alternatively, the administrator can approve the content check failure. If the message passes the check, the message is stored (step 323), the call is ended (step 327) and the user is billed for usage of the system (step 229). Also, the inmate may optionally be notified (step 325). Preferably, the inmate is notified upon attempting access to the system (as shown in FIG. 2). However, it is foreseeable that such methods as notifying the inmate via closed circuit cameras or sending notification via a printed medium to the inmate may be used. Also, it is foreseeable that instead of hearing the message upon accessing the system, the voice message may be converted from voice to text and the text message is delivered via a printed medium with the regular mail or sent to an inmate's email inbox.

These several different notification options can be used individually or as part of a combined effort to notify the message recipient. For example, each inmate and/or contact whose identity is known to the system can have a plurality of notification options associated with them in memory. These options can be based on the preferences of the individual, their capabilities, and/or the options that they have authorized. In other words, an individual that is capable of receiving messages can be limited to certain notification options by their limited capabilities, or can select/approve notification options from among a list of options. The resulting list of notification options are then stored in association with that person so that the person can be notified of a message in accordance with their preferences/capabilities. In an embodiment, the options may be limited by message creator in addition to the message recipient.

Once the list of notification options has been identified by the system, the system can then employ multiple of those notification options as part of a combined effort to inform the recipient of the message. For example, the system may select more than one notification option to be used together for notifying the recipient. Alternatively, the system can perform a hierarchical selection based on the success/failure of an earlier-selected option. For example, in an embodiment, the system selects a first notification option and then carries out the notification option in order to attempt to notify the recipient of the message. If the notification is successful, no further options are pursued. However, if the notification fails (e.g., the notification fails to directly contact the recipient or the recipient fails to respond to the notification within a predetermined time), the system then selects and carries out a second notification option for notifying the recipient. This can continue until a notification is deemed successful, until a predetermined time has passed, or until a predetermined number of notification attempts have been performed.

In an embodiment, the inmate and an outside user can exchange message communications. For example, the outside user can place a phone call to the system. This can be done by attempting to call the inmate directly, or by calling a central number associated with the system. Once connected, the system will authenticate the outside user in any manner previously described. This authentication can also include setting up an account (through the use of telephone prompts or otherwise) and accessing the user's account. After the account has been accessed, the system prompts the outside user to leave a message for a designated inmate. The outside user will dictate his audio message as the system records the message on a replayable medium.

After the system has recorded the message, the system issues a notification to the designated inmate. The notification can include any of the notifications described above, as well as issuing a wireless communication notification to a wireless-enabled device associated with the inmate. In an embodiment, the wireless notification can include a text-converted version of the recorded message. After receiving the notification, the inmate accesses the system. This access includes authentication and account accessing. After authentication, the inmate can prompt the system for playback of the message, which causes the system to replay the message.

In a similar manner, the inmate can leave a message for the outside user. For example, the inmate can provide the system with an audio message either on his own initiative, or in response to receipt of a message from the outside user. As described above with the case of the outside user, the inmate must first access the system. This can involve authentication as well as account access. The inmate can access the system by calling an outside telephone number, a central number associated with the system, or by accessing the system from a terminal or other access device. Once accessed, the inmate designates the outside user for whom the message is being provided. After the outside user has been designated, the system performs a security check in order to make sure that the outside user is callable, i.e., whether the inmate is in any way prohibited from contacting the outside user.

If the security check fails, the inmate is rejected in his request for leaving the message. On the other hand, if the security check passes, the inmate is prompted to leave a message for the outside user. Once the prompt has been issued, the system records an audio message dictated by the inmate for the outside user. After the message has been completed, the system notifies the outside user. This notification can be in the form of a telephone call to the outside user, which, once accepted by the user, can be used to replay the recorded audio message of the inmate. If the call is rejected, the system does not replay the message, and instead deletes the message from storage. The system also prompts the outside user if they would like to block future communications from the inmate. As an alternative notification, the system can transmit an email, text message, or other electronic notification to the outside user. The user can then access the message upon calling the system. In this manner, an inmate and an outside user can exchange message communication. This embodiment can be combined with any of the previously described embodiments.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A platform for processing messages between a message creator and a message recipient, the platform comprising:
    a memory that stores a message and a plurality of notification options associated with the message recipient;
    at least one processor and/or circuit coupled to the memory, the at least one processor and/or circuit configured to:
        receive the message from the message creator;
        receive a selection of a first notification option and a second notification option from among the plurality of notification options from the message creator;

store the message, the first notification option, and the second notification option together in the memory;

carry out the first notification option from among the plurality of notification options in order to attempt to notify the message recipient of the message;

carry out the second notification option from among the plurality of notification options in order to attempt to notify the message recipient of the message upon a failure of the first notification option to successfully notify the message recipient, wherein the first notification option is different from the second notification option.

2. The platform of claim 1, wherein the first notification option includes calling the message recipient in order to provide a verbal notification of the message.

3. The platform of claim 1, wherein the verbal notification is an automated message by an interactive voice response system.

4. The platform of claim 1, wherein the plurality of notification options include at least one of calling the message recipient, sending an Short Message Service (SMS) text message to the message recipient, sending an email to the message recipient, and publicly displaying a notification.

5. The platform of claim 4, wherein at least one of the plurality of notification options includes functionality to allow the message recipient to review the message via the at least one of the plurality of notification options.

6. The platform of claim 1, wherein the received message is a voice message, and wherein at least one of the plurality of notification options includes converting the voice message to text.

7. The platform of claim 1, wherein the received message is a text-based message, and wherein at least one of the plurality of notification options includes converting the text-based message to audio.

8. A method for processing messages between a message creator and a message recipient, the platform comprising:

receiving a message from the message creator;

storing the message in memory;

storing a plurality of notification options in the memory;

determining, based on at least one of the message creator and the message recipient, a first notification option and a second notification option from among the plurality of notification options;

performing the first notification option from among the plurality of notification options in order to attempt to notify the message recipient of the message;

performing the second notification option from among the plurality of notification options in order to attempt to notify the message recipient of the message upon a failure of the first notification option to successfully notify the message recipient, wherein the first notification option is different from the second notification option.

9. The method of claim 1, wherein the first notification option includes calling the message recipient in order to provide a verbal notification of the message.

10. The method of claim 1, wherein the verbal notification is an automated message by an interactive voice response system.

11. The method of claim 1, wherein the plurality of notification options include at least one of calling the message recipient, sending an Short Message Service (SMS) text message to the message recipient, sending an email to the message recipient, and publicly displaying a notification.

12. The method of claim 4, wherein at least one of the plurality of notification options includes functionality to allow the message recipient to review the message via the at least one of the plurality of notification options.

13. The method of claim 1, wherein the received message is a voice message, and wherein at least one of the plurality of notification options includes converting the voice message to text.

14. The method of claim 1, wherein the received message is a text-based message, and wherein at least one of the plurality of notification options includes converting the text-based message to audio.

15. A messaging platform, comprising:

a memory that stores a message and a plurality of notification options associated with a message recipient;

at least one processor and/or circuit coupled to the memory, the at least one processor and/or circuit configured to:

receive the message from a message creator, the message being designated by the message creator for the message recipient;

receive a notification option selection from among the plurality of notification options from the message creator;

store the message and the selected notification option in the memory;

call the message recipient in order to notify the message recipient of the message; and in response to the call failing to notify the message recipient of the message, carry out the selected notification option in order to attempt to notify the message recipient of the message.

16. The messaging platform of claim 15, wherein the failure of the call is defined by the message recipient not answering the call.

17. The messaging platform of claim 15, wherein the failure of the call is defined by the message recipient failing to review the stored message within a predetermined time of the call.

18. The messaging platform of claim 15, wherein the plurality of notification options include at least one of calling the message recipient, sending an Short Message Service (SMS) text message to the message recipient, sending an email to the message recipient, and publicly displaying a notification.

19. The messaging platform of claim 15, wherein the call is carried out at regular intervals so as to repeatedly attempt to notify the message recipient of the message.

20. The messaging platform of claim 15, wherein the message creator is an inmate of a controlled facility, and wherein the message recipient in an outside party that is not an inmate of the controlled facility.

* * * * *